May 14, 1957     H. C. BROWN     2,792,485
ELECTRIC SOLDERING GUN
Filed July 23, 1956
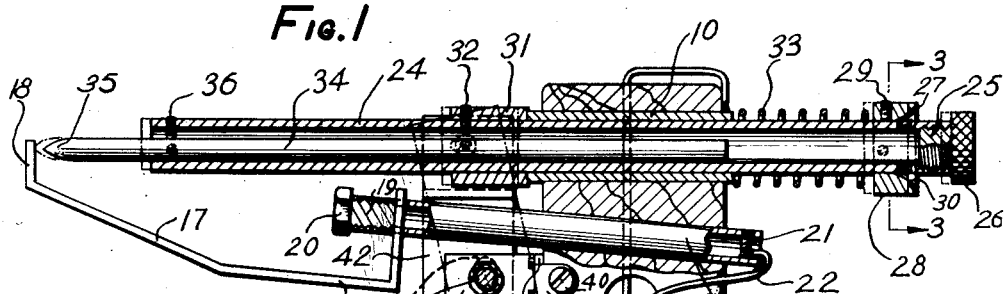
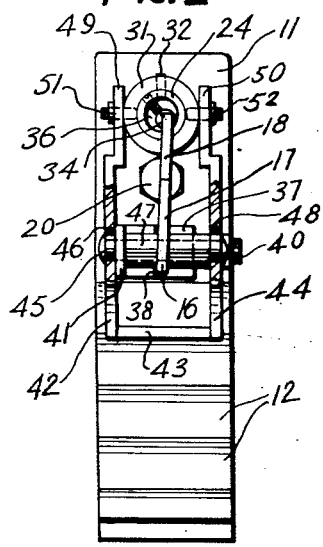
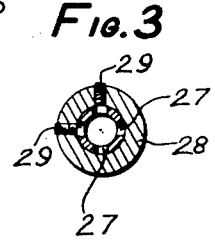
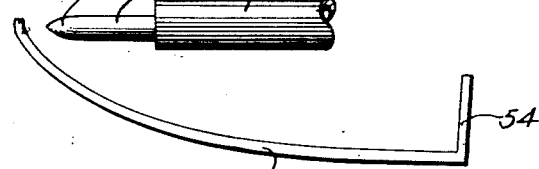
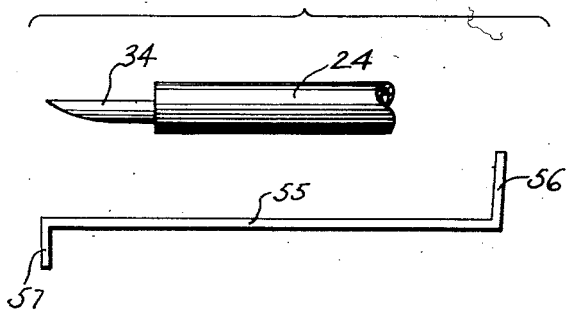
INVENTOR.
HAROLD C. BROWN

2,792,485

ELECTRIC SOLDERING GUN

Harold C. Brown, Monticello, Ill.

Application July 23, 1956, Serial No. 599,553

6 Claims. (Cl. 219—26)

This invention relates to electric soldering guns.

It is an object of the present invention to provide an electric soldering gun which provides instant heat and which is air cooled.

It is another object of the present invention to provide an electric soldering gun of the above type which employs a carbon rod instead of the conventional resistants and wherein the heat is developed at the soldering point only, glare is eliminated from arcing and wherein the waste of heat in heating the conventional copper tip is eliminated.

Other objects of the invention are to provide an electric soldering gun bearing the above objects in mind which is of simple construction, has a minimum number of parts, is inexpensive to manufacture and efficient in use.

For other objects and for a better understanding of the invention, reference may be had to the following detailed description taken in connection with the accompanying drawing, in which:

Figure 1 is a side view shown partly in section and partly in elevation of a preferred embodiment of the present invention;

Fig. 2 is an end elevational view looking from the left of Fig. 1 and shown partly in section;

Fig. 3 is a transverse sectional view taken along the line 3—3 of Fig. 1;

Fig. 4 is a fragmentary side elevational view of a modified form of the present invention; and Fig. 5 is a view similar to Fig. 4 of a still further modified form of the present invention.

Referring now more in detail to the drawing, 10 represents a hollow cylindrical tube of steel which is mounted in the upper end of the handle 11 of wood or plastic having the finger grip portions 12, substantially as illustrated.

The handle 11 is provided with the upwardly extending vertical bore 13 and is provided at one side with the opening 14 providing access to the bore 13.

An upwardly and forwardly inclined brass, hollow cylindrical tube 15 is mounted within the handle 11 above the opening 14, extending forwardly and rearwardly thereof. The forward end of the tube 15 is internally threaded and is provided with vertically aligned openings which receive upwardly therethrough the L-shaped brass soldering rod 16, the rod 16 being formed with the upwardly and forwardly extending portion 17 which terminates in the tip 18 disposed at right angles to the longitudinal axis of the tube 10. The soldering rod is retained in position by means of the externally threaded plug 19 which is screwed into the forward end of the tube 15 and into engagement with the rod 16, the plug 19 having the hexagonal enlarged head 20. The rear end of the tube 15 is provided with the terminal screw 21 which engages the exposed end of the conductor 22 which passes forwardly and inwardly through the opening 14 and downwardly through the bore 13. A second conductor 23 passes upwardly through the bore 13 and upwardly through an opening in the handle 10 where it is connected to the rear end of the tube 10, the lower ends of the conductors 22 and 23 being suitably connected to a source of voltage.

An elongated, hollow cylindrical brass tube 24 is slidably positioned within the tube 10, extending rearwardly and forwardly thereof, the rear end of the tube 24 being internally threaded and receiving therewithin the externally threaded plug 25 having the enlarged externally knurled head 26. The rear end of the tube 24 is provided with angularly spaced openings 27 (Fig. 3) around which is fixedly mounted the collar 28 by means of the angularly spaced set screws 29, the rear interior of the collar 28 being flared as at 30 to permit the free passage of air from within the tube 24 outwardly through the openings 27.

A brass collar 31 is secured to the tube 24 by means of the set screws 32 and serves among other things to limit the rearward displacement of the tube 24 under the action of the coil spring 33 which sleeves the tube intermediate the collar 28 and the rear end of the tube 10 and which serves to retain the tube 24 in the position of Fig. 1.

A carbon rod 34 is positioned within the tube 24 extending forwardly thereof and having a tip 35 which is freely spaced from the tip 18 of the soldering rod, the carbon rod 34 being retained in fixed position within the tube 24 by means of the screw 36. It will be apparent that the rod 34 may be removed rearwardly through the tube 24 by loosening the screw 36 and removing the plug 25.

A bracket 37 is secured across the front edge of the handle 11 by means of the screws 38 and is secured to the sides of the handle by means of the end flanges 39 and screws 40. The plate 37 at one side is integrally formed with the forwardly extending bracket 41 at right angles thereto. One side 42 of the U-shaped trigger member having a bottom portion 43 and an opposite side portion 44 is rotatably mounted on the outer face of the plate 41 by means of the bolt 45, the opening in the plate 42 being elongated upwardly, and as at 46 (Fig. 1) for a purpose which will hereinafter become clear. A spacer member 47 surrounds the bolt 45 intermediate the plate 41 and the trigger side 44, the bolt 45 extending through the trigger side 44. The trigger side 44 is similarly provided with the upwardly elongated opening 48.

The upper ends of the trigger sides 42 and 44 are inwardly offset, as at 49 and 50 and are pivotally connected to the opposite sides of the collar 31 by means of the pins 51 and 52.

In operation, when the trigger 42, 44 is squeezed, as shown in phantom in Fig. 1, the tube 24 and carbon rod 34 are moved forwardly against the action of spring 33 until the carbon rod tip 35 contacts the end 18 of the soldering rod. Simultaneously an instantaneous high heat is developed at the point of contact 18, which becomes a soldering tip. The gun employs current only when the trigger is squeezed. The spring 33 keeps the tube 24 and carbon rod 34 away from the brass rod tip 18 when the soldering gun is not being used. The gun may be used on 6 to 12 volt D. C. or A. C. current. For A. C. use, a step down transformer, not shown, will be required. 20 to 30 amps. are used in the gun. The longer the distance the carbon tip 35 is let out from the brass rod tip 18, the lower the heat which will be generated. The carbon rod should never be shorter than 1½ inches and it should be retained at least 1/16 of an inch away from the brass rod 18 when the trigger is released.

The gun may be employed in three different ways for different soldering jobs. For example, the rods 16, 17, 18 of Fig. 1 would normally be employed for radio work or all light soldering jobs.

As shown in Fig. 4, a brass rod 53 is mounted on the forward end of the tube 15 by means of the vertical portion 54, the rod 53 curving upwardly and forwardly, substantially as illustrated. The rod 53 will be used for soldering tubing, heavy wire or terminals, and hooks under the soldering job, while the carbon rod 35 comes down on top of the job, thus heating the object directly.

Or, as shown in Fig. 5, a straight soldering rod 55 below the tube 24 and parallel thereto is secured to the forward end of the tube 15 by means of the upwardly bent portion 56 and terminates at its other end in a downwardly bent tip 57. This soldering rod will be employed for sheet metal work and the soldering point is intermediate the carbon rod 34 and the front end of the rod 55.

In other respects, the forms of the invention shown in Figs. 4 and 5 are the same as that shown in Figs. 1 through 3, and like reference numerals identify like parts throughout the several views.

The present invention can be used wherever a 6 to 12 volt battery is used on cars, tractors or the like, and the carbon rod will develop a higher heat than the resistance wire. The carbon rod will, it will be noted, be fed to the point of contact at right angles which develops the heat at the tip and not the sides. The tube 24 is kept cool by a current of air flowing over the carbon rod and out the rear end thereof through the openings 27 under the brass collar 28.

It will be noted that the present invention is not an arc gun which is hard on the eyes. Most soldering guns depend upon a resistance to heat a copper tip. With this construction of conventional guns heat is wasted in the wire heating of tip. In the present invention, the carbon rod develops its heat at the soldering point. While the gun was made for radio work, it can be used on most all soldering jobs. For example, it can be used in radio factories, telephone work, appliance factories, car garages, tractor shops, railroad shops and metal shops. A truck driver or farmer or car driver will find the gun useful for breakdowns.

While various changes may be made in the detail construction, it shall be understood that such changes shall be within the spirit and scope of the present invention as defined by the appended claims.

What I claim as new and desire to protect by Letters Patent of the United States is:

1. An electric soldering gun comprising a handle of insulated material, a hollow cylindrical tube fixedly mounted in the upper end of said handle and extending forwardly and rearwardly therethrough, an elongated tube of electrically conductive material slidably positioned within said first tube, said first tube being formed of electrically conductive material, said second tube extending forwardly and rearwardly of said first tube, a first collar secured to said second tube forwardly of said first tube and serving as a stop to limit the rearward displacement of said second tube through said first tube, spring means for urging said second tube rearwardly and said collar into abutment with said first tube, a carbon rod positioned within said second tube and extending forwardly thereof, means for retaining said carbon rod within said second tube, a soldering rod, means for mounting said soldering rod below said second tube in fixed relationship to said handle, said soldering rod being normally displaced freely from the forward end of said carbon rod trigger means for urging said second tube forwardly against the action of said spring means whereby to bring the forward end of said carbon rod into contact with the soldering rod and to develop an instantaneous and high heat at the point of soldering, and means for supplying voltage across said soldering rod and carbon rod tip.

2. An electric soldering gun according to claim 1, said soldering rod mounting means comprising a tube of electrically conductive material mounted in said handle below said first tube and extending forward and rearwardly therethrough, the forward end of said third tube being internally threaded, said third rod at the forward end thereof rearwardly of said internally threaded portion having openings, said soldering rod including an L-shaped portion having a vertical portion extending upwardly through said openings, an externally threaded plug screwed into said third tube into abutment with the vertical portion of said L-shaped soldering rod, said plug having an enlarged head, said L-shaped soldering rod being integrally formed with an upwardly and forwardly extending portion terminating in an upwardly bent vertical portion adapted to contact the tip of the carbon rod when the latter is moved forwardly, said means for supplying voltage across the soldering rod and carbon rod tip comprising said handle having an upwardly extending opening extending partly upwardly therethrough, said handle at one side having an opening communicating with said upwardly extending bore, a first insulated conductor extending upwardly within said bore and outwardly within said bore and outwardly through said opening, said first conductor being connected to the rear end of said third tube, and a second conductor extending upwardly within said bore and through an opening in said handle and being connected to said first tube, said first and second conductors being connected to a source of voltage.

3. An electric soldering gun according to claim 2, said trigger means comprising a plate secured to the forward edge of said handle below said third tube, a forwardly extending bracket fixedly connected to said plate at right angles thereto, a trigger member of L-shaped cross section having its central portion disposed lowermost and a pair of side members extending upwardly on opposite sides of said bracket, a bolt passing through said bracket and through the sides of said trigger member, spacer means on said bolt intermediate the inner face of said bracket and the other of said trigger side members, said trigger side members having vertically elongated openings receiving said bolt therethrough, the upper ends of said trigger side members being inwardly offset and pivotally connected to the opposite sides of said first collar.

4. An electric soldering gun according to claim 3, said spring means comprising a second collar secured to the rear end of said second tube, said second tube within said collar having angularly spaced air openings, said collar being flared rearwardly and outwardly above said openings so as to permit the free circulation of air through said second tube, and a coil spring sleeving said second tube intermediate said second collar and the rear end of said first tube, the rear end of said second tube being internally threaded, an externally threaded plug screwed into said internally threaded opening and having an enlarged head whereby to permit the removal of said carbon rod rearwardly therethrough upon releasing said carbon rod fastening means.

5. An electric soldering gun according to claim 1, said soldering rod having a vertical portion at the rear end thereof engaged by said mounting means, said soldering rod being curved forwardly and upwardly therefrom so as to hook under the soldering job and to adapt the gun for soldering tubing, heavy wire or terminals, the carbon rod tip coming down on top of the job.

6. An electric soldering gun according to claim 1, said soldering rod comprising an elongated horizontal portion vertically spaced below and parallel to said second tube, the inner end of said rod being integrally formed with an upwardly bent portion adapted to be engaged by said soldering rod mounting means, the forward end of said rod being bent downwardly, whereby to adapt the gun for sheet metal work.

References Cited in the file of this patent

UNITED STATES PATENTS

| | | |
|---|---|---|
| 2,295,195 | Barnum | Sept. 8, 1942 |
| 2,605,379 | McKay | July 29, 1952 |

FOREIGN PATENTS

| | | |
|---|---|---|
| 574,392 | Great Britain | Jan. 3, 1946 |